United States Patent Office 3,491,082
Patented Jan. 20, 1970

3,491,082
WATER-INSOLUBLE PHENYL-, THIAZOLYL- AND BENZOTHIAZOLYLAZOPHENYLAMINOALKYL-ENE - 1,2 - BENZISOTHIAZOLIN-3-ONE-1,1-DIOXIDE DYES
Max A. Weaver and Herman S. Pridgen, Kingsport, Tenn., assignors to Eastman Kodak Company, Rochester, N.Y., a corporation of New Jersey
No Drawing. Filed May 24, 1967, Ser. No. 640,841
Int. Cl. C09b 29/36, 29/06
U.S. Cl. 260—158          14 Claims

ABSTRACT OF THE DISCLOSURE

Water-insoluble phenylazoaniline, thiazolylazoaniline, and benzothiazolylazoaniline compounds characterized by the presence of a group having the formula

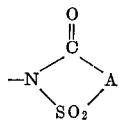

attached through an alkylene radical to the nitrogen atom of the aniline coupling component wherein A is an o-phenylene radical. The disclosed azo compounds produce yellow to blue shades on hydrophobic textile materials and exhibit excellent fastness to light and sublimation.

---

This invention relates to certain novel azo compounds and, more particularly, to certain novel water-insoluble monoazo compounds and to hydrophobic textile materials dyed with such compounds.

The novel water-insoluble azo compounds of the invention have the general formula.

(I)

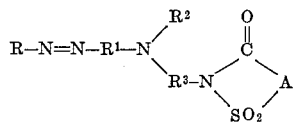

wherein
R represents a phenyl radical, a 2-thiazolyl radical, or a 2-benzothiazolyl radical;
$R^1$ represents a p-phenylene radical;
$R^2$ represents hydrogen, an alkyl radical, a cycloalkyl radical, or a phenyl radical;
$R^3$ represents an alkylene radical; and
A represents an o-phenylene radical.

The novel compounds give yellow to blue dyeings which exhibit excellent fastness properties when applied to hydrophobic textile materials by well-known dyeing procedures. The compounds in general possess exceptionally good fastness to light and sublimation when applied to polyester fibers.

Typical groups represented by R include phenyl, p-nitrophenyl, p - chlorophenyl, o - chloro - p - nitrophenyl, o-methylsulfonyl-p-nitrophenyl, 2,6-dichloro - 4 - nitrophenyl, p-acetylphenyl, p-cyanophenyl, p-methylphenyl, p-sulfamoylphenyl, p - acetamidophenyl, o,p - dimethylsulfonylphenyl, 2,4-dinitro-6-chlorophenyl, p - ethoxycarbonylphenyl, 2-thiazolyl, 5-nitro-2-thiazolyl, 5 - bromo-2-thiazolyl, 5-thiocyanato-2-thiazolyl, 4 - trifluoromethyl-2-thiazolyl, 4-ethoxycarbonyl - 2 - thiazolyl, 5 - cyano-2-thiazolyl, 5-acetamido-2-thiazolyl, 4-methylsulfonyl - 2 - thiazolyl, 4-methyl-5-nitro-2-thiazolyl, 2-benzothiazolyl, 6-methylsulfonyl-2-benzothiazolyl, 6-ethoxycarbonyl - 2 - benzothiazolyl, 6-cyano-2-benzothiazolyl, 6-sulfamoyl-2-benzothiazolyl, 6-thiocyanato-2-benzothiazolyl, 6-N,N-dimethylsulfamoyl-2-benzothiazolyl, 4,6-dichloro-2 - benzothiazolyl, 4-methyl-6-nitro-2-thiazolyl, etc.

Preferred groups represented by R have the general formula

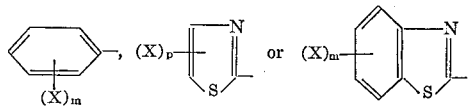

wherein X represents hydrogen, alkyl, substituted alkyl, alkoxy, alkanoylamino, nitro, halogen, cyano, alkylsulfonyl, substituted alkylsulfonyl, carbamoyl, N-alkylcarbamoyl, N,N-dialkylcarbamoyl, benzamido, alkoxycarbonyl, hydroxy, alkanoyl, alkylsulfonamido, sulfamoyl, N - alkylsulfamoyl, N,N - dialkylsulfamoyl, dicarboxylic acid imido, thiocyanato, alkylthio, phenoxy, etc., m represents 1, 2, or 3, and p represents 1 or 2. When m or p is more than 1, the substituents represented by X can be the same or different.

The alkyl and alkoxy groups which X can represent can contain up to about 8 carbon atoms and can be straight or branch chain, unsubstituted or substituted. Examples of the alkyl and alkoxy groups that X can represent are methyl, ethyl, propyl, isopropyl, butyl, isobutyl, amyl, hexyl, 2-ethylhexyl, octyl, methoxy, ethoxy, propoxy, butoxy, hexoxy, etc. Typical substituted alkyl groups represented by X include haloalkyl, e.g. 2-chloroethyl, trifluoromethyl; cyanoalkyl, e.g. 2-cyanoethyl; nitroalkyl, e.g. 2-nitroethyl; hydroxyalkyl, e.g. 2-hydroxyethyl, 2,3-dihydroxypropyl; etc. Preferred alkyl and alkoxy groups that X can represent are lower alkyl and lower alkoxy, i.e. having up to about 4 carbon atoms.

Bromine and chlorine are typical of the halogen atoms that X can represent. The alkanoyl and alkanoylamino groups which X can represent can contain up to about 8 carbon atoms. Examples of such alkanoyl and alkanoylamino groups are acetyl, propionyl, butyryl, acetamido, propionamido, butyamido. Preferred alkanoyl and alkanoylamino groups contain up to about 4 carbon atoms.

The alkylsulfonyl and alkylsulfonamido groups that that X can represent. The alkanoyl and alkanoylamino and preferably up to about 4 carbon atoms such as, for example, methylsulfonyl, ethylsulfonyl, propylsulfonyl, butylsulfonyl, 2-cyanoethylsulfonyl, methylsulfonamido, ethylsulfonamido, butylsulfonamido, etc. The alkoxycarbonyl groups represented by X can contain up to about 9 carbon atoms, preferably up to about 5 carbon atoms. Examples of the alkoxycarbonyl groups include methoxycarbonyl, ethoxycarbonyl, propoxycarbonyl, butoxycarbonyl, etc.

The alkyl groups on the substituted carbamoyl and sulfamoyl groups that X can represent can contain up to about 4 carbon atoms such as, for example, methyl, ethyl, propyl, isopropyl, butyl, etc. Succinimido, glutariimido, maleimido, and phthalimido are typical dicarboximido groups that X can represent. The alkylthio groups which X can represent can contain up to about 8 carbon atoms such as, for example, methylthio, ethylthio, propylthio, butylthio, hexylthio, etc. Such alkylthio groups are preferably lower thioalkyl.

Examples of the p-phenylene groups represented by $R^1$ are p-phenylene, 3-methyl-4-phenylene, 3-chloro-4-phenylene, 3-bromo-4-phenylene, 3-ethoxy - 4 - phenylene, 2-methoxy - 5 - methyl - 4 - phenylene, 2,5 - dimethoxy-4-phenylene, 2,5 - dichloro - 4 - phenylene, 2-methoxy-5-acetamido-4-phenylene, etc. The position of the substituents on the p-phenylene radicals have as their reference point the nitrogen atom of the aniline precursors, i.e. the aniline nitrogen atom is at the 1 position.

Preferred p-phenylene groups represented by R¹ have the formula

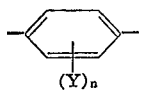

wherein Y represents hydrogen, alkyl, substituted alkyl, alkoxy, halogen, alkanoylamino, alkoxycarbonylamino, alkylsulfonamido, alkylthio, benzamido, dicarboxylic acid imido, etc. and $n$ represents 1, 2, or 3. Examples of these groups are given in the definition of X above and in the definition of R² and R³ below. The alkyl moiety of the alkyl, alkoxy, carboxylic acid imido, alkylsulfonamido, and alkylthio groups that Y can represent is preferably lower alkyl. When $n$ represents 2 or 3, the substituents represented by Y can be the same or different.

The alkyl radical which R² can represent can be straight or branch chain, unsubstituted or substituted alkyl of up to about 8 carbon atoms. Examples of the unsubstituted alkyl groups represented by R² are set forth in the preceding definition of X. Examples of the substituted alkyl groups that R² can represent are hydroxyalkyl, e.g. 2-hydroxyalkyl, e.g. 2-methoxyethyl; cyanoalkyl, e.g. 2-cyanoethyl; cyanoalkoxyalkyl, e.g. 2-cyanoethoxyethyl; alkanoyloxyalkyl, e.g. 2-acetoxyethyl; alkoxycarbonylalkyl, e.g. 2-ethoxycarbonylethyl; alkoxycarbonyloxyalkyl, e.g. 2-ethoxycarbonyloxyethyl; haloalkyl, e.g. 2 - chloroethyl, 3-chloropropyl; 2 - bromoethyl; hydroxyhaloalkyl, e.g. 3-chloro - 2 - hydroxypropyl; alkylsulfonylalkyl, e.g. 2-methylsulfonylethyl; alkoxylcarbonyloxyalkyl, e.g. 2-methoxycarbonyloxyethyl; carbamoylalkyl, e.g. 2 - carbamoylethyl; dicarboxylic acid imidoalkyl, e.g. 2 - succinimidoethyl, 3 - phthalimidopropyl; benzyl; phenoxyalkyl e.g. 2 - phenoxyethyl; alkylsulfonamidoalkyl, e.g. 2-methylsulfonamidoethyl; N - alkylcarbamoylalkyl, e.g. 2 - N-ethylcarbomoylethyl; etc. Preferably, the alkyl moiety, if any, of the substituents on the substituted alkyl group represented by R² contains up to about four carbon atoms, e.g. lower alkoxy, lower alkylsulfonyl, etc. and the alkyl group attached to the anilino nitrogen atom is lower alkyl.

Cyclohexyl and lower substituted cyclohexyl are typical of the cycloalkyl radicals which R² can represent. The phenyl radical that R² can represent includes, for example, phenyl and phenyl substituted with lower alkyl, e.g. p-tolyl; lower alkoxy, e.g. p-anisyl; halogen, e.g. p-bromophenyl, o,p-dichlorophenyl; nitro; etc.

The alkylene group represented by R³ can be straight or branched chain, unsubstituted or substituted alkylene of up to about 8 carbon atoms. Preferably, R³ represents a lower alkylene group having up to about 4 carbon atoms. Examples of the alkylene groups represented by R³ are ethylene, propylene, isopropylene, n-butylene, isobutylene hexamethylene, haloalkylene, e.g. 2-chloropropylene, 2 - bromopropylene, chloroethylene, hydroxyalkylene, e.g. 2 - hydroxypropylene, hydroxyethylene, lower alkanolyloxyalkylene, e.g. 2-acetoxypropylene, etc.

The o-phenylene group represented by A can represent unsubstituted and substituted o-phenylene. Examples of the substituents that can be present on the o-phenylene group include halogen, e.g. chlorine and bromine; nitro; amino; lower alkanoylamino, e.g. acetamido; lower alkoxycarbonylamino, e.g. ethoxycarbonylamino; lower alkylsulfonamido, e.g. methylsulfonamido, butylsulfonamido; lower alkyl, e.g. methyl, ethyl, propyl, isobutyl; lower alkoxy, e.g. methoxy, ethoxy, butoxy; cyano; lower alkoxycarbonyl; e.g. ethoxycarbonyl, propoxycarbonyl; hydroxy; lower alkanoyloxy; e.g. acetoxy; carbamoyl; lower alkylthio, e.g. methylthio, ethylthio; dicarboximido, e.g. succinimido, phthalimido, glutarimido, maleimido; etc.

A preferred group of o-phenylene radicals represented by A have the formula

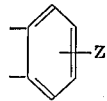

wherein Z represents hydrogen, halogen, lower alkyl, lower alkoxy, lower alkoxycarbonyl, lower alkoxycarbonylamino, nitro, amino, or lower alkanoylamino. Examples of the substituted o-phenylene groups include 4-chloro-2-phenylene, 4 - bromo - 2 - phenylene, 4-nitro-2-phenylene, 4-amino - 2 - phenylene, 4-acetamido - 2 - phenylene, 5 - propionamido - 2 - phenylene, 3-methyl-2-phenylene and 4-methoxy - 2 - phenylene.

Particularly preferred water-insoluble monoazo compounds of the invention have the formula (II)

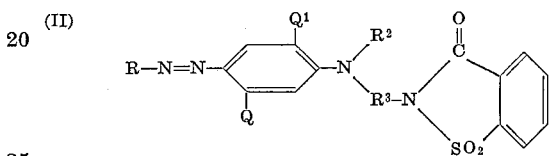

wherein R represents a group having the formula

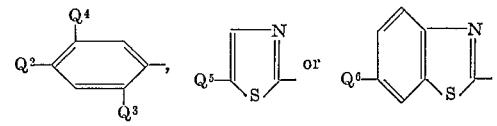

wherein Q² and Q³ are the same or different and each represents hydrogen, nitro, halogen, lower alkanoyl, cyano, lower alkylsulfonyl, or sulfamoyl;

Q⁴ represents hydrogen, halogen, cyano, nitro, or lower alkylsulfonyl;

Q⁵ represents nitro, halogen, cyano, lower alkoxycarbonyl, or lower alkylsulfonyl;

Q⁶ represents nitro, cyano, lower alkylsulfonyl, lower alkoxylcarbonyl, or thiocyanato;

Q represents hydrogen, lower alkyl, lower alkoxy, halogen, or lower alkanoylamino;

Q¹ represents hydrogen, lower alkyl, lower alkoxy, or halogen;

R² represents lower alkyl or lower alkyl substituted with halogen, hydroxy, cyano, lower alkoxy, or lower alkanoyloxy; and R³ represents lower alkylene, especially ethylene.

As is well known, the basic color of the novel monoazo compounds of the invention is attributable to the conjugation of the phenylazophenylamino, thiazolylazophenylamino, or benzothiazolylazophenylamino systems. The primary usefulness of the compounds of the invention, i.e. as dyes, is not materially affected by the substituents present on the groups R, R¹, R², R³, and A, as those groups and substituents are defined above. Such substituents serve primarily as auxochrome groups to vary the shade of the monoazo compounds.

The novel water-insoluble compounds of the invention are prepared by procedures and from intermediates which are well known in the art. For example, an aniline, a 2-aminothiazoyl, or a 2 - aminobenzothiazolyl compound is diazotized and the diazonium salt is coupled with an aniline derivative having the formula (III)

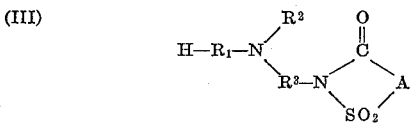

wherein R¹, R², R³ and A are defined above. The compounds of Formula III are prepared by the reaction of the corresponding N-haloalkylaniline with a 1,2-benzisothiazolin-3-one-1,1-dioxide according to the following equation:

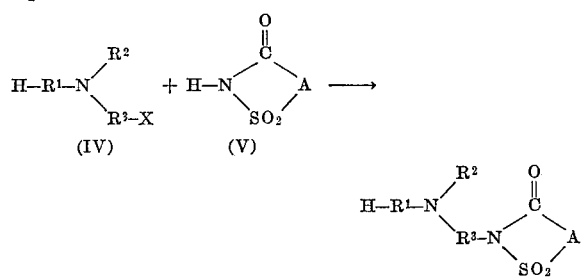

where X represents halogen, e.g. chlorine. The intermediates of Formulae IV and V are known in the literature and/or can be prepared according to techniques well known in the art.

The following examples will further describe and illustrate the preparation of representative examples of the monoazo compounds of the invention.

PREPARATION OF THE COUPLERS

Example 1.—Preparation of 2-[2-N-ethyl-m-toluidino) ethyl]-1,2-benzisothiazolin-3-one-1,1-dioxide 19.7 g. N-β-chloroethyl-N-ethyl-m-toluidine, 18.3 g. 1,2-benzisothiazolin-3-one-1,1-dioxide, 13.8 g. potassium carbonate, and 100 cc. dimethylformamide are heated and stirred at reflux for one hour. The reaction mixture is drowned into water. The product crystallizes on standing and is collected by filtration, washed with water, and air dried. It is recrystallized from methanol, melts at 78.5–79.5° C. and has the structure:

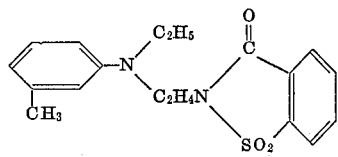

Example 2.—Preparation of 2-[2-(N-ethylanilino) ethyl]-1,2-benzisothiazolin-3-one-1,1-dioxide 18.3 g. N-β-chloroethyl-N-ethylaniline, 18.3 g. 1,2-benzisothiazolin-3-one-1,1-dioxide, 13.8 g. potassium carbonate, and 100 ml. dimethyl formamide are reacted as in Example 1 to give the product. It is recrystallized from ethanol and melts at 80–81° C. It has the structure:

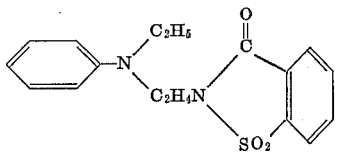

Example 3.—Preparation of 2-[2-(o-chloroanilino) ethyl]-1,2-benzisothiazolin-3-one-1,1-dioxide 19.0 g. N-β-chloroethyl-o-chloroaniline, 18.3 g. 1,2-benzisothiazolin-3-one-1,1-dioxide, 13.8 g. potassium, and 100 ml. dimethylformamide are reacted as in Example 1. The product is recrystallized from 3:2 ethanol:methylcellosolve solution. It melts at 153–5° C. and has the structure:

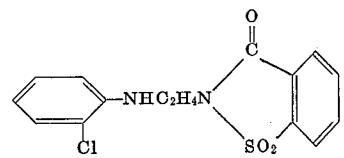

PREPARATION OF THE DYES

Example 4

0.72 g. NaNO₂ is added portionwise to 5 cc. conc. H₂SO₄. This solution is cooled and 10 ml. 1:5 acid (1 part propionic: 5 parts acetic) is added below 15° C. This is stirred at about 5° C. and 1.72 g. 2-chloro-4-nitroaniline is added, followed by 10 cc. 1:5 acid. The diazotization is stirred at 0–5° C. for 3 hours and then added to a chilled solution of 3.44 g. 2-[2-(N-ethyl-m-toluidino) ethyl]-1,2-benzisothiazolin-3-one-1,1-dioxide dissolved in 100 ml. 1:5 acid. The coupling is kept cold and neutralized in Congo Red paper with ammonium acetate. After allowing to couple 2 hours, the mixture is drowned with water and the product collected by filtration, washed with water, and air dried. This dye colors polyester fibers a deep shade of red having excellent light and sublimation fastness. It has the structure:

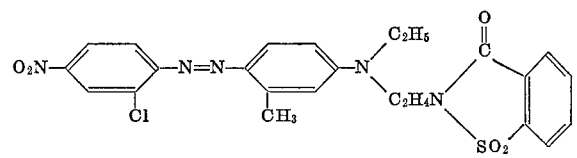

Example 5

1.72 g. 2-chloro-4-nitroaniline is diazotized as in Example 4 and coupled with 3.30 g. 2-[2-(N-ethylanilino) ethyl]-1,2-benzisothiazolin-3-one-1,1-dioxide. The dye is isolated as in Example 4 and has the following structure:

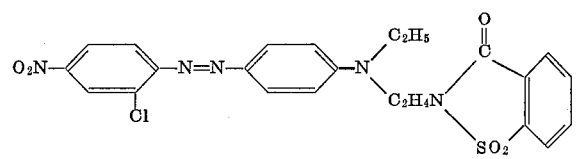

This dye produces red shades on polyester fibers and has excellent light and sublimation fastness.

Example 6

2.17 g. 2-bromo-4-nitroaniline is diazotized and coupled with 3.30 g. 2-[2-(N-ethylanilino)ethyl]1,2-benzisothiazolin-3-one-1,1-dioxide as illustrated in Example 4 to give a red dye of the following structure:

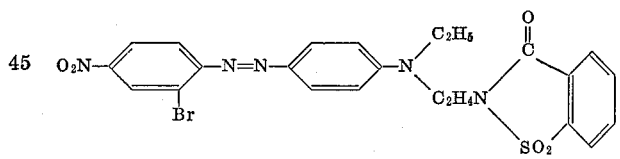

Example 7

1.53 g. 2-cyano-4-nitroaniline is diazotized and coupled with 3.44 g. 2-[2-(N-ethyl-m-toluidino)ethyl]-1,2-benzisothiazolin-3-one-1,1-dioxide as illustrated in Example 4 to give a dye which produces a rubine shade on polyester fibers. It has the following structure:

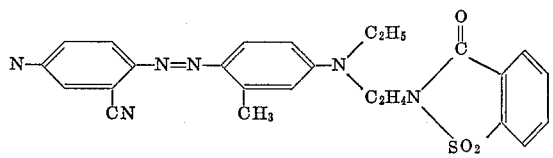

Example 8

6.9 g. 4-nitroaniline is dissolved in 5.4 cc. conc. H₂SO₄ and 12.6 cc. water. This solution is poured onto 50 g ice and then a solution of 3.6 g. NaNO₂ in 8 cc. water is added all at once. The diazotization reaction is stirred at 5° C. for 1 hour and then is added to a chilled solution of 17.2 g. 2-[2-(N-ethyl-m-toluidino)ethyl]-1,2-benzisothiazolin-3-one-1,1-dioxide dissolved in 500 ml. of 1:5 acid. The coupling is neutralized with ammonium acetate until a test sample was neutral to Congo Red test paper. After coupling 2 hours, the mixture is drowned with water. The product is collected by filtration, washed with water, and air dried. It produces bright orange shades when dyed on polyester fibers and has the following structure:

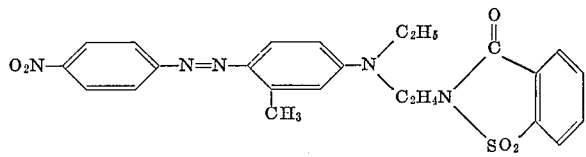

The compounds set forth in the examples of Table I are prepared by the above procedures described in Examples 4 and 8 and conform to the general formula:

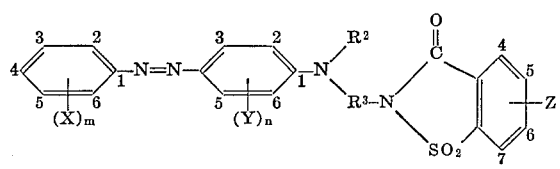

TABLE I

| Example Number | $(X)_m$ | $(Y)_n$ | $R^2$ | $R^3$ | Z | Color on Polyester |
|---|---|---|---|---|---|---|
| 9 | 2-Cl-4-$NO_2$ | 3-$CH_3$ | —$CH_3$ | —$CH_2CH_2$— | H | Red. |
| 10 | 2-Cl-4-$NO_2$ | 3-Cl | —$C_2H_4OCH_3$ | —$CH_2CH_2$— | H | Red. |
| 11 | 2-Cl-4-$NO_2$ | 3-$OCH_3$ | —$C_2H_5$ | —$CH_2CH_2$— | H | Red. |
| 12 | 2-Cl-4-$NO_2$ | 3-$NHCOCH_3$ | —$C_2H_5$ | —$CH_2CH_2$— | H | Red. |
| 13 | 2-Cl-4-$NO_2$ | 3-$NHCOC_2H_5$ | —$C_2H_5$ | —$CH_2CH_2$— | H | Red. |
| 14 | 2-Cl-4-$NO_2$ | 3-$NHSO_2CH_3$ | —$CH_2CH_2CH_3$ | —$CH_2CH_2$— | H | Red. |
| 15 | 2-Cl-4-$NO_2$ | 3-NHCONH—C₆H₅ | —CH(CH₃)—CH—$CH_3$ | —$CH_2CH_2$— | H | Red. |
| 16 | 2-Cl-4-$NO_2$ | 3-NHCO—C₆H₅ | —$C_2H_5$ | —$CH_2CH_2$— | H | Red. |
| 17 | 4-$NO_2$ | 3-$CH_3$ | —$C_2H_4CN$ | —$CH_2CH_2$— | H | Orange. |
| 18 | 4-$NO_2$ | 3-Cl | —$C_2H_4Cl$ | —$CH_2CH_2$— | 5-chloro | Do. |
| 19 | 4-$NO_2$ | 3,5-di-$CH_3$ | —$C_2H_5$ | —$CH_2CH_2$— | 5-chloro | Do. |
| 20 | 4-$NO_2$ | 2,5-di-$CH_3$ | —$C_2H_5$ | —$CH_2CH_2$— | 5-nitro | Do. |
| 21 | 4-$NO_2$ | 3-$CH_3$ | —$C_2H_4SO_2CH_3$ | —$CH_2CH_2$— | 5-$NH_2$ | Do. |
| 22 | 4-$NO_2$ | 3-$CH_3$ | —$C_2H_4CONH_2$ | —$CH_2CN_2$— | 5-$NHCOCH_3$ | Do. |
| 23 | 4-$NO_2$ | 3-$CH_3$ | —$C_2H_4OCOCH_3$ | —$CH_2CH_2$— | H | Do. |
| 24 | 4-$NO_2$ | 3-$CH_3$ | —$C_2H_4OH$ | —$CH_2CH_2$— | H | Do. |
| 25 | 4-$NO_2$ | 3-$CH_3$ | —$C_2H_5$ | —$CH_2CH_2CH_2$— | H | Do. |
| 26 | 2-CN-4-$NO_2$ | H | —$C_2H_5$ | —$CH_2CH_2CH_2$— | H | Red. |
| 27 | 2-CN-4-$NO_2$ | 3-$CH_3$ | —$C_2H_5$ | —$CH_2CH(OH)CH_2$— | H | Red. |
| 28 | 2-CN-4-$NO_2$ | 3-$CH_3$ | —$C_2H_5$ | —$CH_2CH(Cl)—CH_2$— | H | Red. |
| 29 | 2-CN-4-$NO_2$ | 3-$CH_3$ | —$C_2H_5$ | —$CH_2CH(OCOCH_3)CH_2$— | H | Red. |
| 30 | 2-CN-4-$NO_2$ | 3-$NHCOCH_3$ | —$C_2H_5$ | —$CH_2CH_2$— | H | Violet. |
| 31 | 2-CN-4,6-di-$NO_2$ | 3-$NHCOCH_3$ | —$C_2H_5$ | —$CH_2CH_2$— | H | Blue. |
| 32 | 2-CN-4,6-di-$NO_2$ | 3-$NHCOOC_2H_5$ | —$C_2H_5$ | —$CH_2CH_2$— | H | Do. |
| 33 | 2-CN-4,6-di-$NO_2$ | 3-$CH_3$ | —$C_2H_5$ | —$CH_2CH_2$— | H | Do. |
| 34 | 2-CN-4,6-di-$NO_2$ | 2-$OCH_3$, 5-$NHCOCH_3$ | —$C_2H_5$ | —$CH_2CH_2$— | H | Do. |
| 35 | 2-CN-4,6-di-$NO_2$ | 2-$CH_3$, 5-$NHCOCH_3$ | —$C_2H_5$ | —$CH_2CH_2$— | H | Do. |
| 36 | 2-CN-4,6-di-$NO_2$ | 2-$OCH_3$, 5-$NHCOCH_3$ | H | —$CH_2CH_2$— | H | Do. |
| 37 | 2-CN-4,6-di-$NO_2$ | 2-$OCH_3$, 5-$NHCOCH_3$ | H | —$CH_2CH(OH)CH_2$— | H | Do. |
| 38 | 2-Cl-4,6-di-$NO_2$ | 3-$CH_3$ | —$C_2H_5$ | —$CH_2CH_2$— | H | Violet. |
| 39 | 2-Cl-4,6-di-$NO_2$ | 2-$OCH_3$, 5-$NHCOCH_3$ | —$C_2H_5$ | —$CH_2CH_2$— | H | Blue. |
| 40 | 2-Cl-4,6-di-$NO_2$ | 2-$OCH_3$, 5-$NHCOCH_3$ | —H | —$CH_2CH_2$— | H | Do. |
| 41 | 2,6-di-Cl-4-$NO_2$ | 3-$CH_3$ | —$C_2H_5$ | —$CH_2CH_2$— | H | Brown. |
| 42 | 2,6-di-Cl-4-$NO_2$ | H | —$C_2H_5$ | —$CH_2CH_2$— | H | Red. |
| 43 | 2,6-di-Cl-4-$NO_2$ | 2-Cl | —H | —$CH_2CH_2$— | H | Orange. |
| 44 | 2,6-di-Cl-4-$NO_2$ | 2-$CH_3$ | —H | —$CH_2CH_2$— | H | Do. |
| 45 | 2,6-di-Cl-4-$NO_2$ | 2-$CH_3$ | —$C_2H_5$ | —$CH_2CH_2$— | H | Do. |
| 46 | 2,6-di-Cl-4-$NO_2$ | 2-$OCH_2$ | —H | —$CH_2CH_2$— | H | Do. |
| 47 | 2-Cl-4-$SO_2CH_3$ | 3-$CH_3$ | —$C_2H_5$ | —$CH_2CH_2$— | H | Red. |
| 48 | 2-Cl-4-$SO_2CH_3$ | 3-$CH_3$ | —$C_2H_5$ | —$CH_2CH_2$— | H | Red. |
| 49 | 2,4-di-$SO_2CH_3$ | 3-$CH_3$ | —$C_2H_5$ | —$CH_2CH_2$— | 5-$COOC_2H_5$ | Red. |
| 50 | 2,4-di-$SO_2CH_3$ | 3-$CH_3$ | —$C_4H_9$-n | —$CH_2CH_2$— | 5-$COOC_2H_5$ | Red. |
| 51 | 2-$SO_2CH_3$-4-$NO_2$ | 3-$CH_3$ | —$C_2H_5$ | —$CH_2CH_2$— | H | Violet. |
| 52 | 2-$SO_2CH_3$-4-$NO_2$ | 3-$CH_3$ | -cyclohexyl | —$CH_2CH_2$— | H | Do. |
| 53 | 2-$SO_2CH_3$-4-$NO_2$ | 3-$CH_3$ | -phenyl | —$CH_2CH_2$— | H | Do. |
| 54 | 4-Cl | 3-$CH_3$ | —$C_2H_5$ | —$CH_2CH_2$— | H | Do. |
| 55 | 4-$CH_3$ | 3-$CH_3$ | —$C_2H_5$ | —$CH_2CH_2$— | H | Do. |
| 56 | 4-$COOC_2H_5$ | 3-$CH_3$ | —$C_2H_5$ | —$CH_2CH_2$— | H | Do. |
| 57 | 4-CHO | 3-$CH_3$ | —$C_2H_5$ | —$CH_2CH_2$— | H | Do. |
| 58 | 4-CN | 3-$CH_3$ | —$C_2H_5$ | —$CH_2CH_2$— | H | Orange. |
| 59 | 2,4-di-CN | 3-$CH_3$ | —$C_2H_5$ | —$CH_2CH_2$— | H | Do. |
| 60 | 2-CN-4-Cl | 3-$CH_3$ | —$C_2H_5$ | —$CH_2CH_2$— | H | Do. |
| 61 | 4-CN-4-$SO_2CH_3$ | 3-$CH_3$ | —$C_2H_5$ | —$CH_2CH_2$— | H | Red. |
| 62 | 4-$SO_2NH_2$ | 3-$CH_3$ | —$C_2H_5$ | —$CH_2CH_2$— | H | Orange. |
| 63 | 4-$CONH_2$ | 3-$CH_3$ | —$C_2H_5$ | —$CH_2CH_2$— | H | Do. |
| 64 | 2-$COOCH_3$-4-$NO_2$ | 3-$CH_3$ | —$C_2H_5$ | —$CH_2CH_2$— | H | Red. |
| 65 | 4-$CF_3$ | 3-$CH_3$ | —$C_2H_5$ | —$CH_2CH_2$— | H | Orange. |
| 66 | 2-$CF_3$-4-$NO_2$ | 3-$CH_3$ | —$C_2H_5$ | —$CH_2CH_2$— | H | Red. |

Example 67

To 2.9 g. 2-amino-5-nitrothiazole, stirred in 25 cc. water, is added 13.6 cc. conc. $H_2SO_4$. Immediate solution results. The solution is cooled to $-10°$ C. and a solution of 1.4 g. $NaNO_2$ in 10 cc. conc. $H_2SO_4$ is added below $-5°$ C. Stirring at about $-5°$ C. is continued for 15 minutes. This diazonium solution is then added to a chilled solution of 6.88 g. 2-[2-(N-ethyl-m-toluidino)ethyl]-1,2-benzisothiazolin-3-one-1,1-dioxide in 100 ml. 1:5 acid, plus 100 ml. 15% $H_2SO_4$. The temperature is kept at 0–5° C. for 30 minutes and the coupling mixture is drowned with water. The dye is collected by filtration, washed with water, and air dried. The dye produces reddish blue shades on polyester fibers. It has the following structure:

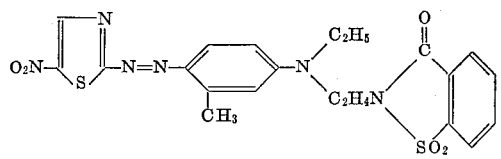

hour at about 5° C. and then is drowned with water. The product is collected by filtration, washed with water and air dried. The dye produces reddish blue shades on polyester fibers.

The compounds of the examples of Table II are prepared by diazotizing the 2-aminothiazole compound, either by the procedure described in Example 68 or by using nitrosylsulfuric acid in 1:5 acid, and coupling with the appropriate coupler. The compounds give dyeings of excellent fastness properties on polyester fibers and conform to the general formula:

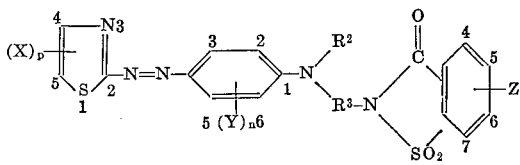

TABLE II

| Example Number | $(X)_p$ | $(Y)_n$ | $R^2$ | $R^3$ | Z | Color on Polyester |
|---|---|---|---|---|---|---|
| 69 | 5-$NO_2$ | 3-$CH_3$ | —$C_2H_5$ | —$CH_2CH_2$— | 6-$NO_2$ | Blue. |
| 70 | 5-$NO_2$ | 3-$CH_3$ | —$C_2H_5$ | —$CH_2CH_2$— | 6-$NH_2$ | Do. |
| 71 | 5-$NO_2$ | 3-$CH_3$ | —$C_2H_5$ | —$CH_2CH_2$— | 5-$NHCOC_2H_5$ | Do. |
| 72 | 5-$NO_2$ | H | —$C_2H_5$ | —$CH_2CH_2$— | 6-$NHCOOC_2H_5$ | Violet. |
| 73 | 5-$NO_2$ | 3-Cl | —$C_2H_5$ | —$CH_2CH_2$— | 5-Cl | Do. |
| 74 | 5-$NO_2$ | 3-$OCH_3$ | —$C_2H_5$ | —$CH_2CH_2$— | H | Blue. |
| 75 | 5-$NO_2$ | 2-$OCH_3$-5-$NHCOCH_3$ | —$C_2H_5$ | —$CH_2CH_2$— | H | Do. |
| 76 | 5-$NO_2$ | 2-$CH_3$-5-$NHCOCH_3$ | —$C_2H_5$ | —$CH_2CH_2$— | H | Do. |
| 77 | 5-$NO_2$ | 5-$NHCOC_2H_5$ | —$C_2H_5$ | —$CH_2CH_2$— | H | Do. |
| 78 | 5-$NO_2$ | 5-$NHCOCH_2OH$ | —$C_2H_5$ | —$CH_2CH_2$— | H | Do. |
| 79 | 5-$NO_2$ | 5-$NHCOOC_2H_5$ | —$C_2H_5$ | —$CH_2CH_2$— | H | Do. |
| 80 | 5-$NO_2$ | 5-$NHSO_2CH_3$ | —$C_2H_5$ | —$CH_2CH_2$— | H | Do. |
| 81 | 4-$CH_3$-5-$NO_2$ | 3-$CH_3$ | —$C_2H_5$ | —$CH_2CH_2$— | H | Do. |
| 82 | 4-$CH_3$-5-$NO_2$ | 2,5-di-$OCH_3$ | —$C_2H_5$ | —$CH_2CH_2$— | H | Do. |
| 83 | 4-$CH_3$-5-$NO_2$ | 2-$OCH_3$, 5-$CH_3$ | —$C_2H_5$ | —$CH_2\overset{OH}{C}HCH_2$— | H | Do. |
| 84 | 4-$CH_3$-5-$NO_2$ | 2,5-di-$CH_3$ | —$CH_2\overset{OH}{C}HCH_2Cl$ | —$CH_2CH_2$— | H | Do. |
| 85 | 4-$CH_3$-5-$NO_2$ | 2-Cl | H | —$CH_2CH_2$— | H | Do. |
| 86 | 4-$CH_3$-5-$NO_2$ | 2-$CH_3$ | H | —$CH_2CH_2$— | H | Do. |
| 87 | 5-CN | 3-$CH_3$ | —$C_2H_5$ | —$CH_2CH_2$— | H | Red. |
| 88 | 5-CN | H | —$C_2H_5$ | —$CH_2CH_2$— | H | Red. |
| 89 | 5-CN | H | —$CH_3$ | —$CH_2CH_2$— | H | Red. |
| 90 | 5-CN | H | —$C_2H_4OH$ | —$CH_2CH_2$— | H | Red. |
| 91 | 5-CN | H | —$C_2H_4Cl$ | —$CH_2CH_2$— | H | Red. |
| 92 | 5-CN | 3-$CH_3$ | —$C_2H_4CN$ | —$CH_2CH_2$— | H | Red. |
| 93 | 4-$CF_3$ | 3-$CH_3$ | —$C_2H_5$ | —$CH_2CH_2CH_2$— | H | Red. |
| 94 | 4-$CF_3$ | 3-$CH_3$ | —$C_2H_5$ | —$CH_2$— | H | Red. |
| 95 | 4-$CF_3$ | 3-$CH_3$ | -phenyl | —$CH_2CH_2$— | H | Red. |
| 96 | 5-$SO_2CH_3$ | 3-$CH_3$ | —$C_2H_5$ | —$CH_2CH_2$— | H | Violet. |
| 97 | 5-$SO_2CH_3$ | H | —$C_2H_5$ | —$CH_2CH_2$— | H | Do. |
| 98 | 5-$SO_2C_4H_9$-n | 3-$CH_3$ | —$C_2H_5$ | —$CH_2CH_2$— | H | Do. |
| 99 | 5-Cl | 3-$CH_3$ | —$C_2H_5$ | —$CH_2CH_2$— | H | Red. |
| 100 | 5-$COOC_2H_5$ | 3-$CH_3$ | —$C_2H_5$ | —$CH_2CH_2$— | H | Red. |
| 101 | 4-$CH_3$-5-COCH | 3-$NHCOCH_3$ | —$C_2H_5$ | —$CH_2CH_2$— | H | Violet. |
| 102 | 5-SCN | 3-$NHCOCH_3$ | —$C_2H_5$ | —$CH_2CH_2$— | H | Do. |
| 103 | 5-$CONH_2$ | 3-$NHCOCH_3$ | —$C_2H_5$ | —$CH_2CH_2$— | H | Do. |
| 104 | 5-$SO_2C_2H_4CN$ | 3-$NHCOCH_3$ | —$C_2H_5$ | —$CH_2CH_2$— | H | Do. |
| 105 | 4-$COOCH_3$-5-$NO_2$ | 3-$NHCOCH_3$ | —$C_2H_5$ | —$CH_2CH_2$— | H | Blue. |
| 106 | 4-phenyl | 3-$NHCOCH_3$ | —$C_2H_5$ | —$CH_2CH_2$— | H | Red. |
| 107 | 4-$NHCOCH_3$ | 3-$NHCOCH_3$ | —$C_2H_5$ | —$CH_2CH_2$— | H | Red. |
| 108 | 5-CHO | 3-$NHCOCH_3$ | —$C_2H_5$ | —$CH_2CH_2$— | H | Violet. |
| 109 | 4-phenyl-5-CHO | 3-$NHCOCH_3$ | —$C_2H_5$ | —$CH_2CH_2$— | H | Do. |
| 110 | 4-phenyl-5-CN | 3-$NHCOCH_3$ | —$C_2H_5$ | —$CH_2CH_2$— | H | Do. |
| 111 | 4-$CH_3$-5-CN | 3-$NHCOCH_3$ | —$C_2H_5$ | —$CH_2CH_2$— | H | Do. |

Example 68

1.45 g. 2-amino-5-nitrothiazole is diazotized as described in Example 67 and the solution added to .01 m. of the coupler:

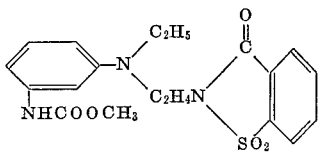

in 100 ml. of 15% $H_2SO_4$ plus 100 ml. of 1:5 acid, all at 0–5° C. The reaction mixture is allowed to stand 1

Example 112

To 2.28 g. 2-amino-6-methylsulfonylbenzothiazole suspended in 24 ml. of water is added 26.2 g. conc. $H_2SO_4$. After all the amine has dissolved, the solution is cooled and a solution of 0.84 g. $NaNO_2$ in 5.0 ml. conc. $H_2SO_4$ is added portionwise below 0° C. The diazotization reaction is stirred for 2 hours at about 0° C. and then is added to a solution of 3.44 g. 2-[N-ethyl-mtoluidino) ethyl]-1,2-benzisothiazolin-3-one-1,1-dioxide dissolved in 50 ml. 15% $H_2SO_4$ plus 50 ml. 1:5 acid, all below 15° C. The temperature is kept at 10–15° C. for 1 hour and then the coupling mixture is drowned with water. The dye is collected by filtration, washed with water and air dried.

It dyes polyester fibers bright red shades exhibiting excellent fastness properties and has the structure:

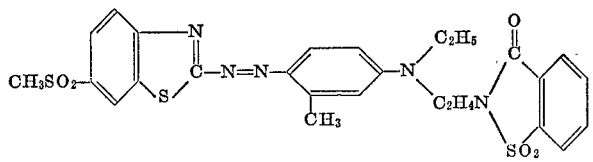

Example 113

1.95 g. 2-amino-6-nitrobenzothiazole is diazotized as in Example 112 added to a solution of 3.30 g. 2-[2-(N-ethylanilino)ethyl] - 1,2 - benzisothiazolin - 3 - one - 1,1-dioxide in 50 ml. 15% $H_2SO_4$ plus 50 ml. 1:5 acid, at 5–10° C. After allowing to couple 1 hour, the coupling mixture is drowned with water. The dye is isolated by filtration, washed with water, and air dried. It dyes polyester fibers bordeaux shades of excellent fastness properties and has the structure:

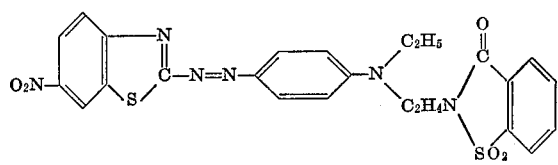

Example 114

Sodium nitrite (0.76 g.) is added portionwise to 5 ml. conc. $H_2SO_4$. This solution is cooled in ice-bath and 10 ml. 1:5 acid is added, keeping the temperature below 15° C. This mixture is stirred at 0–5° C. and 1.76 g. 2-amino-6-cyanobenzothiazole is added, followed by 10 ml. 1:5 acid. The diazotization is stirred at 0–5° C. for 2 hours and is then added to a chilled solution of 3.44 g. 2-[2-(N - ethyl - m - toluidino)ethyl] - 1,2 - benzisothiazolin-3-one-1,1-dioxide in 100 ml. 1:5 acid at about 5° C. The coupling reaction is buffered with ammonium acetate and allowed to react at ice-bath temperature for 2 hours. It is then drowned with water. The product is collected by filtration, washed with water, and air dried. It dyes polyester fibers bright red shades and has the structure:

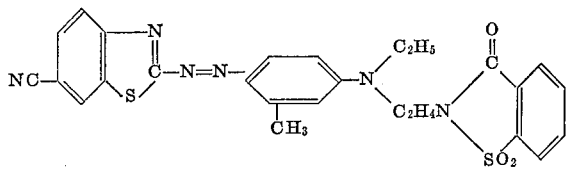

The compounds of the examples of Table III are prepared according to the procedures described in Examples 112 through 114 and conform to the general formula

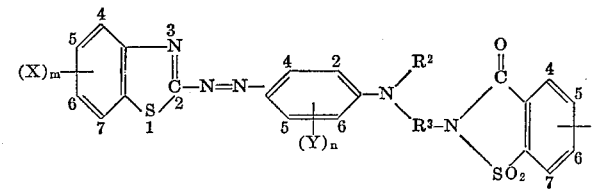

TABLE III

| Example Number | $(X)_m$ | $(Y)_n$ | $R^2$ | $R^3$ | Z | Color on Polyester |
|---|---|---|---|---|---|---|
| 115 | 6-$SO_2CH_3$ | 3-$CH_3$ | —$C_2H_5$ | —$CH_2CH_2$— | 5-Cl | Red. |
| 116 | 6-$SO_2CH_3$ | 3-$CH_3$ | —$C_2H_4OCH_3$ | —$CH_2CH_2$— | 4-$CH_3$ | Red. |
| 117 | 6-$SO_2CH_3$ | 3-$CH_3$ | —$C_2H_4OCH_3$ | —$CH_2CH_2$— | 5-$NO_2$ | Red. |
| 118 | 6-$SO_2CH_3$ | 3-$CH_3$ | —$C_2H_4CN$ | —$CH_2CH_2$— | H | Scarlet. |
| 119 | 6-$SO_2CH_3$ | H | —$C_2H_4CN$ | —$CH_2CH_2$— | H | Do. |
| 120 | 6-$SO_2CH_3$ | H | —$C_2H_4CONH_2$ | —$CH_2CH_2$— | H | Red. |
| 121 | 6-$SO_2CH_3$ | H | —$C_2H_4O\overset{O}{\overset{\|}{C}}CH_3$ | —$CH_2CH_2$— | H | Red. |
| 122 | 6-$SO_2CH_3$ | H | —$C_2H_4O\overset{O}{\overset{\|}{C}}OC_2H_5$ | —$CH_2CH_2$— | H | Red. |
| 123 | 6-$SO_2CH_3$ | 3-$OCH_3$ | —$C_2H_5$ | —$CH_2$— | H | Red. |
| 124 | 6-$SO_2CH_3$ | 3-$NHCOCH_3$ | —$C_2H_5$ | —$CH_2CH_2$— | H | Red. |
| 125 | 6-$SO_2CH_3$ | 2-$OCH_3$-5-$NHCOCH_3$ | —$C_2H_5$ | —$CH_2CH_2$— | H | Violet. |
| 126 | 6-$NO_2$ | 3-$CH_3$ | —$C_2H_5$ | —$CH_2CH_2$— | H | Do. |
| 127 | 6-$NO_2$ | 3-$CH_3$ | -cyclohexyl | —$CH_2CH_2$— | H | Do. |
| 128 | 6-$NO_2$ | 3-$CH_3$ | -phenyl | —$CH_2CH_2$— | H | Do. |
| 129 | 6-$NO_2$ | H | —$C_2H_5$ | —$CH_2\overset{OH}{\overset{\|}{C}H}CH_2$— | H | Bordeuax. |
| 130 | 6-$NO_2$ | H | —$C_2H_5$ | —$CH_2CH_2CH_2$— | H | Do. |
| 131 | 6-$NO_2$ | H | —$C_2H_5$ | —$CH_2\overset{CH_3}{\overset{\|}{C}H}$— | H | Do. |
| 132 | 6-$NO_2$ | H | —$C_2H_5$ | —$CH_2\overset{OCOCH_3}{\overset{\|}{C}H}$—$CH_2$— | H | Do. |
| 133 | 6-$NO_2$ | H | —$C_2H_5$ | —$CH_2\overset{Cl}{\overset{\|}{C}H}CH_2$— | H | Do. |
| 134 | 6-CH | H | —$C_2H_5$ | —$CH_2CH_2$— | H | Red. |
| 135 | 6-CN | 3,5-di-$CH_3$ | —$C_2H_5$ | —$CH_2CH_2$— | 6-$NO_2$ | Red. |
| 136 | 6-CN | 2,5-di-$CH_3$ | —$C_2H_5$ | —$CH_2CH_2$— | 6-$NHCOCH_3$ | Red. |
| 137 | 6-CN | 2,5-di-$OCH_3$ | —$C_2H_5$ | —$CH_2CH_2$— | 6-$NHCOCH_3$ | Red. |
| 138 | 6-CN | 3-$OCH_3$-5-$CH_3$ | —$C_2H_5$ | —$CH_2CH_2$— | H | Red. |
| 139 | 6-$COOC_2H_5$ | 3-$CH_3$ | —$C_2H_5$ | —$CH_2CH_2$— | H | Red. |
| 140 | 6-$COOC_2H_5$ | H | —$C_2H_5$ | —$CH_2CH_2$— | H | Red. |
| 141 | 6-$COOC_2H_5$ | 3-$NHCOCH_3$ | —$C_2H_5$ | —$CH_2CH_2$— | H | Red. |
| 142 | 6-$COOC_2H_5$ | 3-Cl | —$C_2H_5$ | —$CH_2CH_2$— | H | Red. |
| 143 | 6-$COOC_2H_5$ | 2-Cl-5-$OCH_3$ | —$C_2H_5$ | —$CH_2CH_2$— | H | Red. |
| 144 | 4-Cl-6-$SO_2CH_3$ | 3-$NHCOCH_3$ | —$C_2H_5$ | —$CH_2CH_2$— | H | Violet. |
| 145 | 4,6-di-$NO_2$ | 3-$NHCOCH_3$ | —$C_2H_5$ | —$CH_2CH_2$— | H | Blue. |
| 146 | 4,6-di-$NO_2$ | 2-$OCH_3$-5-$NHCOCH_3$ | —$C_2H_5$ | —$CH_2CH_2$— | H | Do. |
| 147 | 4-Cl | 3-$CH_3$ | —$C_2H_5$ | —$CH_2CH_2$— | H | Red. |
| 148 | 6-Cl | 3-$CH_3$ | —$C_2H_5$ | —$CH_2CH_2$— | H | Red. |
| 149 | 6-SCN | 3-$CH_3$ | —$C_2H_5$ | —$CH_2CH_2$— | H | Red. |

TABLE III—Continued

| Example Number | (X)_m | (Y)_n | R² | R³ | Z | Color on Polyester |
|---|---|---|---|---|---|---|
| 150 | 6-SCN | 3-CH₃ | —C₂H₄OCOCH₃ | —CH₂CH₂— | H | Red. |
| 151 | 6-SO₂C₂H₄CN | 3-CH₃ | —C₂H₅ | —CH₂CH₂— | H | Red. |
| 152 | 6-CONH₂ | 3-CH₃ | —C₂H₅ | —CH₂CH₂— | H | Red. |
| 153 | 6-SCH₃ | 3-CH₃ | —C₂H₅ | —CH₂CH₂— | H | Red. |
| 154 | 6-SO₂NH₂ | 3-CH₃ | —C₂H₅ | —CH₂CH₂— | H | Red. |
| 155 | 6-SO₂N(CH₃)₂ | 3-CH₃ | —C₂H₅ | —CH₂CH₂— | H | Red. |
| 156 | 6-NHCOCH₃ | 3-CH₃ | —C₂H₅ | —CH₂CH₂— | H | Red. |
| 157 | 6-CH₃ | 3-CH₃ | —C₂H₅ | —CH₂CH₂— | H | Red. |
| 158 | H | 3-CH₃ | —C₂H₅ | —CH₂CH₂— | H | Red. |

The water-insoluble azo compounds of the invention can be used for dyeing textile materials, giving a variety of fast bright yellow to blue shades, including orange, violet, red and rubine, when applied thereto by conventional dyeing methods. The azo compounds have good affinity for cellulose ester, polyester, and nylon fibers. Since the compounds are water-insoluble they of course, are free of water-solubilizing groups such as sulfo and carboxyl. In general, the dyes have good fasteness, for example, to light, washing, gas (atmospheric fumes) and sublimation, when tested by methods such as are described in the A.A.T.C.C. Technical Manual, 1965 edition. As mentioned hereinbefore, the azo compounds possess excellent fastness to sublimation and/or light when dyed on polyesters.

The compounds of the invention can be used for dyeing hydrophobic fibers such as linear polyester, cellulose ester, acrylic, polyamide, etc., fibers in the manner described in U.S. Patents 2,880,050, 2,757,064, 2,782,187 and 3,043,827. The following example illustrates a method by which the azo compounds of the invention can be used to dye polyester textile materials.

EXAMPLE 159

An amount of 0.1 g. of the dye is dissolved in the dye pot by warming in 5 cc. of ethylene glycol monomethyl ether. A 2% sodium-N-methyl-N-oleyl taurate and 0.5% sodium lignin sulfonate aqueous solution is added, with stirring, until a fine emulsion is obtained. Water is then slowly added to a total volume of 200 cc. Then, 3 cc. of "Dacronyx" (a chlorinated benzene emulsion) are added and 10 grams of a textile fabric made of poly(ethylene terephthalate) fibers are entered. The fabric is worked 10 minutes without heat and then for 10 minutes at 80° C. The dye bath is then brought to the boil and held at the boil for one hour. Following this, the fabric is rinsed in warm water, then scoured in aqueous 0.2% soap, 0.2% soda ash solution. After scouring, fabric is rinsed with water and dried.

When the compounds of the invention are used to dye polyamide textile materials, the above procedure can be employed except the "Dacronyx" dyeing assistant need not be used. When cellulose acetate fibers are dyed with the compounds, the above procedure can be followed omitting the "Dacronyx" dyeing assistant and carrying out the dyeing at 80° C. for one hour rather than at the boil.

The compounds of the invention can also be applied to polyester textile materials by the heat fixation technique of dyeing. This procedure is described in U.S. Patent 2,663,612 and in the American Dyestuff Reporter, 42, 1 (1953). Coloration can also be effected, for example, by incorporating the compounds into the spinning dope or melt and spinning the fiber as usual.

Polymeric linear polyester materials of the terephthalate type are illustrative of the linear aromatic polyester textile materials that can be dyed with the compounds of our invention. Examples of linear polyester textile materials that can be dyed with the compounds of the invention are those prepared from ethylene glycol and dimethylterephthalate or from cyclohexanedimethanol and dimethylterephthalate. Polyesters prepared from cyclohexanedimethanol and dimethylterephthalate are more particularly described in U.S. Patent 2,901,446. Poly(ethylene terephthalate) polyester fibers are described, for example, in U.S. Patent 2,465,319. The polymeric linear polyester materials disclosed in U.S. Patents 2,945,010, 2,957,745 and 2,989,363 for example, can be dyed. The linear aromatic polyester materials specifically named have a melting point of at least 200° C.

Examples of the polyamide fibers that can be dyed with the compounds of the invention are those consisting of nylon 66 made by the polymerization of adipic acid and hexamethylenediamine, nylon 6, prepared from epsilon-aminocaproic acid lactam, and nylon 8. The cellulose acetate fibers that can be dyed with the compounds of the invention include fibers consisting of either cellulose triacetate or partially hydrolyzed cellulose acetate.

The invention has been described in considerable detail with particular reference to certain preferred embodiments thereof, but it will be understood that variations and modifications can be effected within the spirit and scope of the invention as described above.

We claim:

1. A water-insoluble monoazo compound having the formula

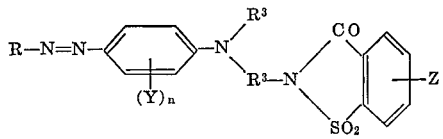

wherein R represents a phenyl radical, a 2-thiazolyl radical, or a 2-benzothiazolyl radical having respectively the formulas

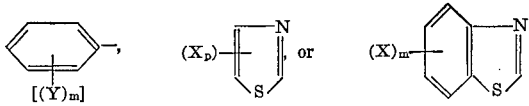

wherein X represents hydrogen, lower alkyl, lower alkoxy, lower alkanoylamino, nitro, chlorine, bromine, cyano, lower alkylsulfonyl, carbamoyl, N.-lower alkylcarbamoyl, N,N-di-lower alkylcarbamoyl, lower alkoxycarbonyl, lower alkanoyl, lower alkylsufonamido, sulfamoyl, N-lower alkylsulfamoyl, N,N-di-lower alkylsulfamoyl, thiocyanato, or lower alkylthio, m represents 1, 2 or 3, and p represents 1 or 2;

Y represents hydrogen, lower alkyl, lower alkoxy, chlorine, bromine, lower alkanoylamino, lower alkylsulfonamido, lower alkoxycarbonylamino, benzamido, or lower alkylthio, and n represents 1, 2 or 3;

R² represents hydrogen; lower alkyl; lower alkyl substituted with hydroxy, chlorine, bromine, cyano, nitro, lower alkanoyloxy, lower alkoxy, lower alkoxycarbonyl, lower alkylsulfonyl, carbamoyl, lower alkoxycarbonyloxy, lower alkanoylamino, or lower alkylsulfonylamino; benzyl; cyclohexyl; phenyl; or phenyl substituted with lower alkyl, lower alkoxy, chlorine, or bromine;

R³ represents lower alkylene or lower alkylene substituted with hydroxy, chlorine, bromine, or lower alkanoyloxy; and Z represents hydrogen, chlorine, bromine, lower alkyl, lower alkoxy, lower alkoxycarbonyl, lower alkoxycarbonylamino, nitro, amino, or lower alkanoylamino.

2. A water-insoluble monazo compound according to claim 1 having the formula

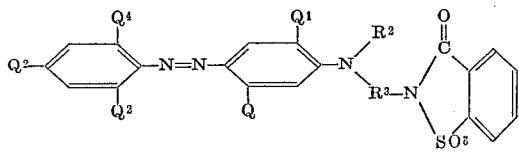

wherein
  $Q^2$ and $Q^3$ are the same or different and each represents hydrogen, nitro, chlorine, bromine, lower alkanoyl, cyano, lower alkylsulfonyl, or sulfamoyl;
  $Q^4$ represents hydrogen, chlorine, bromine, cyano, nitro, or lower alkylsulfonyl;
  Q represents hydrogen, lower alkyl, lower alkoxy, chlorine, bromine, or lower alkanoylamino;
  $Q^1$ represents hydrogen, lower alkyl, lower alkoxy, chlorine, or bromine;
  $R^2$ represents lower alkyl, or lower alkyl substituted with chlorine, bromine, hydroxy, cyano, lower alkoxy, or lower alkanoyloxy; and
  $R^3$ represents lower alkylene.

3. A compound according to claim 1 having the formula

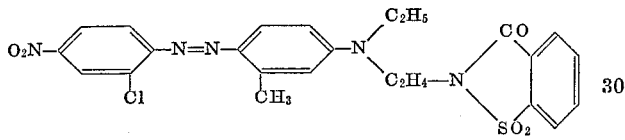

4. A compound according to claim 1 having the formula

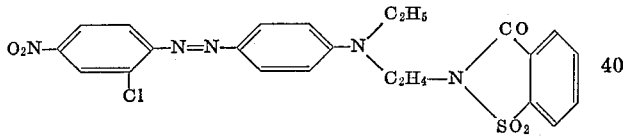

5. A compound according to claim 1 having the formula

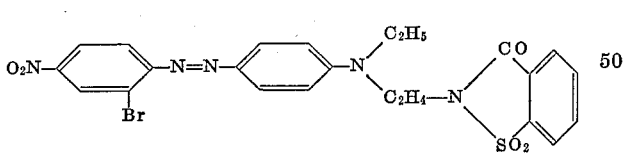

6. A compound according to claim 1 having the formula

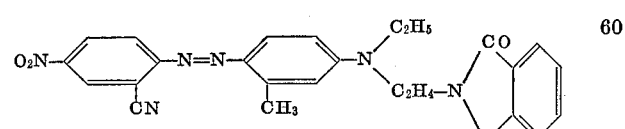

7. A compound according to claim 1 having the formula

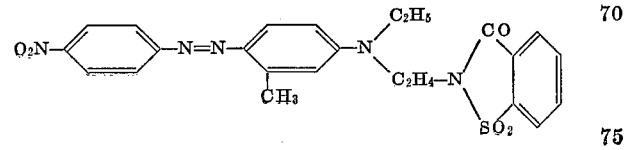

8. A water-insoluble monoazo compound according to claim 1 having the formula

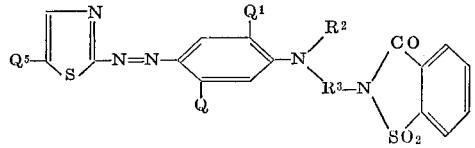

wherein
  $Q^5$ represents nitro, chlorine, bromine, cyano, lower alkoxycarbonyl, or lower alkylsulfonyl;
  Q represents hydrogen, lower alkyl, lower alkoxy, chlorine, bromine, or lower alkanoylamino;
  $Q^1$ represents hydrogen, lower alkyl, lower alkoxy, chlorine, or bromine;
  $R^2$ represents lower alkyl or lower alkyl substituted with chlorine, bromine, hydroxy, cyano, lower alkoxy, or lower alkanoyloxy;
  $R^3$ represents lower alkylene.

9. A compound according to claim 1 having the formula

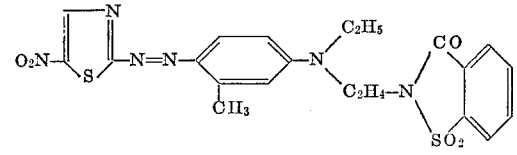

10. A compound according to claim 1 having the formula

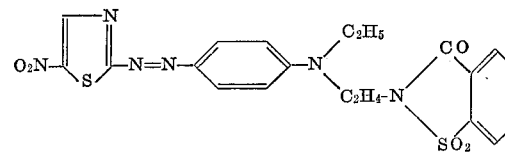

11. A water-insoluble monoazo compound according to claim 1 having the formula

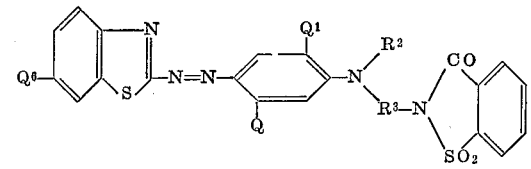

wherein
  $Q^6$ represents nitro, cyano, lower alkylsulfonyl, lower alkoxycarbonyl, or thiocyanato;
  Q represents hydrogen, lower alkyl, lower alkoxy, chlorine, bromine, or lower alkanoylamino;
  $Q^1$ represents hydrogen, lower alkyl, lower alkoxy, chlorine, or bromine;
  $R^2$ represents lower alkyl or lower alkyl substituted with chlorine, bromine, hydroxy, cyano, lower alkoxy, or lower alkanoyloxy; and
  $R^3$ represents lower alkylene.

12. A compound according to claim 1 having the formula

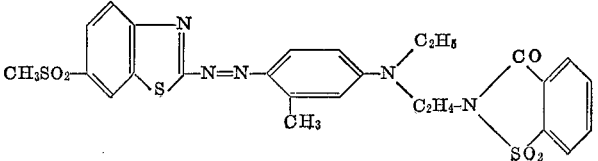

13. A compound according to claim 1 having the formula
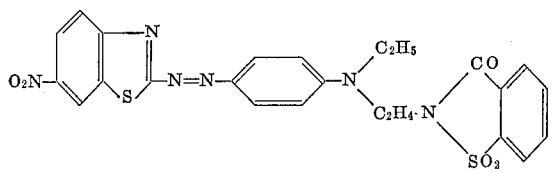
14. A compound according to claim 1 having the formula
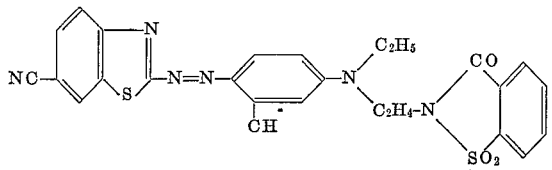
References Cited
UNITED STATES PATENTS
| | | | |
|---|---|---|---|
| 2,955,901 | 10/1960 | Kruckenberg | 260—158 XR |
| 3,148,178 | 9/1964 | Wallace et al. | 260—152 |
| 3,148,180 | 9/1964 | Straley et al. | 260—158 |
| 3,349,076 | 10/1967 | Weaver et al. | 260—152 |
| 3,370,055 | 2/1968 | Weaver et al. | 260—158 |
| 3,379,713 | 4/1968 | Wallace et al. | 260—158 |
| 3,380,990 | 4/1968 | Wallace et al. | 260—158 |
| 3,383,380 | 5/1968 | Straley et al. | 260—158 |
| 3,394,121 | 7/1968 | Weaver et al. | 260—152 |
| 3,429,871 | 2/1969 | Weaver et al. | 260—158 |
FLOYD D. HIGEL, Primary Examiner
U.S. Cl. X.R.
8—41, 50, 4; 117—138.8; 260—152, 302, 305, 306.7, 37, 40

UNITED STATES PATENT OFFICE
CERTIFICATE OF CORRECTION

Patent No. 3,491,082   Dated January 20, 1970

Inventor(s) Max A. Weaver and Herman S. Pridgen

It is certified that error appears in the above-identified patent and that said Letters Patent are hereby corrected as shown below:

Column 2, line 40, "butyamido" should ---butyramido---.

Column 2, line 43, cancel ". The alkanoyl and alkanoylamino" and insert ---can contain up to about 8 carbon atoms,---.

Column 3, line 27, cancel "2-hy-" and insert ---2-hydroxyethyl; polyhydroxyalkyl, e.g. 2,3-dihydroxypropyl;---.

Column 6, lines 57 through 62, the formula should read:

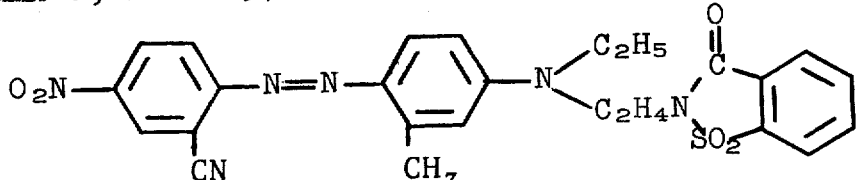

Columns 7 and 8, Table I, Example 46, under the column "$(Y)_n$", "2-$OCH_2$" should be ---2-$OCH_3$---.

Columns 9 and 10, Table II, Example 101, under the column "$(X)_p$", "4-$CH_3$-5-COCH" should be ---4-$CH_3$-5-$COCH_3$---.

Column 10, line 70, "2-[N-ethyl-mtoluidino)" should read ---2-[N-ethyl-m-toluidino)---.

Column 12, lines 23 through 31, the formula should read:

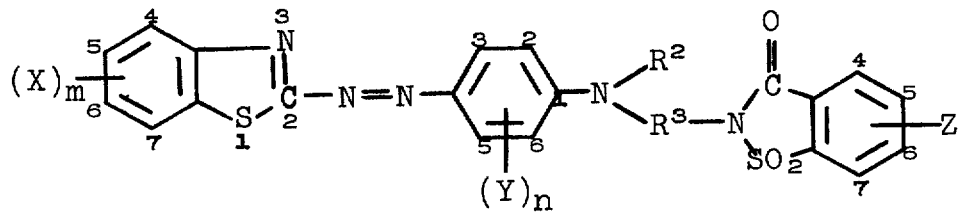

Continued .......

PO-1050
(5/69)

UNITED STATES PATENT OFFICE
CERTIFICATE OF CORRECTION

Patent No. 3,491,082      Dated January 20, 1970

PAGE- 2

Inventor(s) Max A. Weaver and Herman S. Pridgen

It is certified that error appears in the above-identified patent and that said Letters Patent are hereby corrected as shown below:

Page 2

Claim 1, the first formula should read:

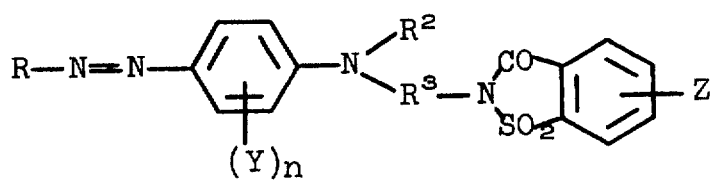

Claim 2, the formula should read:

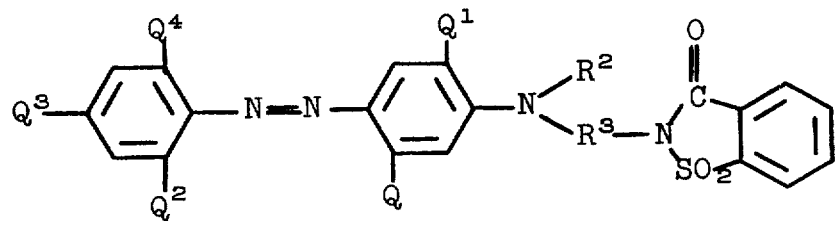

SIGNED AND
SEALED

SEP 29 1970

(SEAL)
Attest:

Edward M. Fletcher, Jr.
Attesting Officer

WILLIAM E. SCHUYLER, JR.
Commissioner of Patents